(12) United States Patent
Yuan (10) Patent No.: US 9,346,207 B2
(45) Date of Patent: May 24, 2016

(54) HYDRAULIC DRIVE CIRCUIT WITH PARALLEL ARCHITECTURED ACCUMULATOR

(71) Applicant: Eaton Corporation, Cleveland, OH (US)

(72) Inventor: QingHui Yuan, Maple Grove, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/604,328

(22) Filed: Jan. 23, 2015

(65) Prior Publication Data

US 2015/0132426 A1    May 14, 2015

Related U.S. Application Data

(63) Continuation of application No. 13/273,596, filed on Oct. 14, 2011, now abandoned.

(60) Provisional application No. 61/393,968, filed on Oct. 18, 2010.

(51) Int. Cl.
  *B29C 45/77*    (2006.01)
  *F15B 1/02*    (2006.01)
  *F15B 1/033*    (2006.01)
  (Continued)

(52) U.S. Cl.
  CPC ............... *B29C 45/77* (2013.01); *F04B 49/002* (2013.01); *F15B 1/024* (2013.01); *F15B 1/033* (2013.01); *B29C 45/5008* (2013.01); *B29C 45/67* (2013.01); *B29C 45/82* (2013.01); *B29C 2045/824* (2013.01); *B29C 2045/826* (2013.01); *F15B 2211/20515* (2013.01); *F15B 2211/20538* (2013.01); *F15B 2211/212* (2013.01); *F15B 2211/40515* (2013.01);
  (Continued)

(58) Field of Classification Search
  CPC .............. B29C 45/82; B29C 2045/824; B29C 2045/826
  See application file for complete search history.

(56) References Cited

U.S. PATENT DOCUMENTS

| 2,817,489 | A |   | 12/1957 | Hesmer |
| 4,066,189 | A | * | 1/1978  | Toyoaki et al. ............... 222/334 |

(Continued)

FOREIGN PATENT DOCUMENTS

| DE | 35 24 790 A1  | 1/1987 |
| DE | 101 52 198 A1 | 5/2003 |

(Continued)

OTHER PUBLICATIONS

Figures 1-6 and the Background Section of the parent disclosure (U.S. Appl. No. 13/273,596).

(Continued)

*Primary Examiner* — Jeremiah Smith
(74) *Attorney, Agent, or Firm* — Merchant & Gould P.C.

(57) ABSTRACT

A hydraulic circuit architecture for use in a drive circuit having a hydraulic pump for driving a load is disclosed. The hydraulic circuit architecture includes a flow control valve for controlling a hydraulic fluid flow rate supplied from the hydraulic pump to the load. The hydraulic circuit architecture also includes a hydraulic fluid accumulator arranged in parallel with respect to the flow control valve. Hydraulic circuit architectures having multiple accumulators arranged in parallel with respect to the flow control valve are also disclosed.

15 Claims, 12 Drawing Sheets

(51) Int. Cl.
*F04B 49/00* (2006.01)
*B29C 45/82* (2006.01)
*B29C 45/50* (2006.01)
*B29C 45/67* (2006.01)

(52) U.S. Cl.
CPC .............. *F15B 2211/50518* (2013.01); *F15B 2211/6309* (2013.01); *F15B 2211/6313* (2013.01); *Y02P 80/13* (2015.11)

(56) References Cited

U.S. PATENT DOCUMENTS

| | | |
|---|---|---|
| 4,891,941 A | 1/1990 | Heintz |
| 6,120,711 A | 9/2000 | Takizawa |
| 6,148,947 A | 11/2000 | Eberhart et al. |
| 6,167,701 B1 | 1/2001 | Hatcher et al. |
| 6,216,456 B1 | 4/2001 | Mitchell |
| 6,280,170 B1 | 8/2001 | Furuya et al. |
| 6,878,317 B2 | 4/2005 | Kubota |
| 8,991,167 B2 | 3/2015 | Yuan et al. |
| 2003/0115863 A1 | 6/2003 | Holt et al. |
| 2005/0258795 A1* | 11/2005 | Choi .......................... 318/625 |
| 2006/0070378 A1* | 4/2006 | Geiger ........................... 60/475 |
| 2006/0075749 A1 | 4/2006 | Cherney et al. |
| 2007/0052137 A1 | 3/2007 | Tanemura et al. |
| 2007/0235892 A1* | 10/2007 | Zander et al. .................. 264/85 |
| 2008/0066989 A1* | 3/2008 | Edson et al. .................. 180/415 |
| 2008/0110166 A1 | 5/2008 | Stephenson et al. |
| 2008/0288115 A1 | 11/2008 | Rusnak et al. |
| 2009/0217653 A1 | 9/2009 | Zhang et al. |
| 2012/0090308 A1 | 4/2012 | Yuan et al. |
| 2012/0093968 A1 | 4/2012 | Yuan |
| 2015/0361996 A1 | 12/2015 | Yuan et al. |

FOREIGN PATENT DOCUMENTS

| | | | |
|---|---|---|---|
| EM | 1 287 968 A2 | 3/2003 | |
| JP | 63-39315 | * 8/1986 | ............. B29C 45/82 |
| JP | 2001-150120 | * 6/2001 | ............. B29C 45/82 |
| JP | 2009 226448 | 10/2009 | |

OTHER PUBLICATIONS

International Search Report and Written Opinion for International Application No. PCT/US2011/056414 mailed Jul. 2, 2013.

Jaeger, A., "Hybridmaschine auf dem Prüfstand," *KU Kunststoffe*, vol. 90, No. 9, pp. 40-45 (2000).

* cited by examiner

HYDRAULIC DRIVE CIRCUIT WITH PARALLEL ARCHITECTURED ACCUMULATOR

CROSS REFERENCE TO RELATED APPLICATIONS

This application is a continuation of U.S. Ser. No. 13/273,596, filed Oct. 14, 2011, which claims the benefit of U.S. Provisional Application No. 61/393,968, filed Oct. 18, 2010, and titled "Parallel Architectured Intelligent Accumulator (PAIA) for Energy Saving," the disclosure of which is hereby incorporated herein by reference.

TECHNICAL FIELD

The present disclosure relates generally to hydraulic drive circuits. More particularly, present disclosure relates to hydraulic drive circuits including accumulators for improving energy efficiency.

BACKGROUND

Hydraulically powered machines employing repeating work cycles are common in manufacturing and heavy industry. Within the work cycles of such machines, it is common for the power demand to vary dramatically. Such power variations can present difficulties for designing efficient hydraulic drive systems. Low cost, energy efficient solutions are needed in this area.

Figure 1:
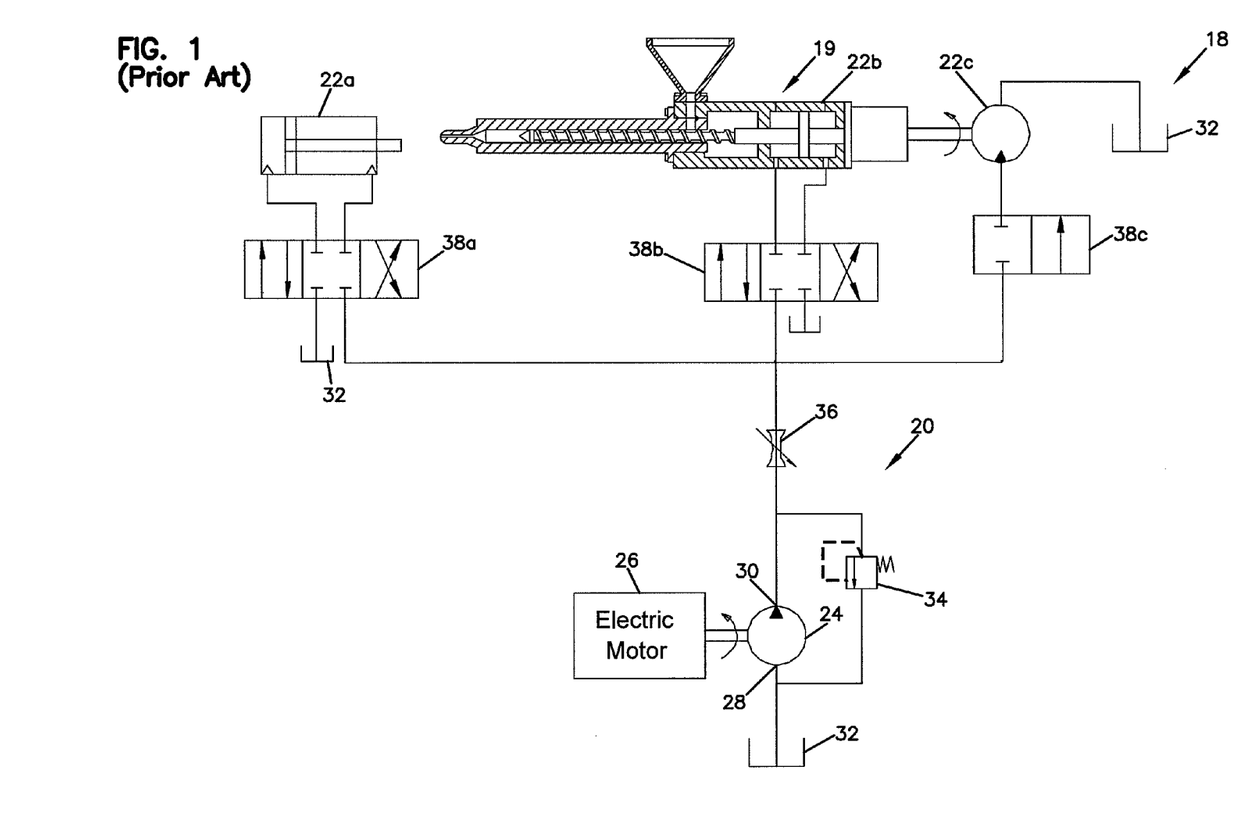
FIG. 1 is a schematic diagram showing a prior art hydraulic system that includes a hydraulic drive circuit that drives components of an industrial machine.

FIG. 1 shows a prior art hydraulic system 18 including a hydraulic drive circuit 20 for powering operation of a machine 19 having a repeating work cycle (e.g., an injection molding machine). The machine 19 includes actuators 22a, 22b, 22c that are powered by the hydraulic drive circuit 20. The hydraulic drive circuit 20 includes a fixed displacement pump 24 driven by a constant speed electric motor 26. The pump 24 includes an inlet 28 and outlet 30. The inlet 28 connects to a reservoir 32 (i.e., a tank) and the outlet 30 connects to a relief valve 34 and flow control valve 36. The relief valve 34 controls the pump outlet pressure (i.e., the hydraulic system pressure) by passing extra flow to the reservoir 32. The flow control valve 36 controls the flow rate of the hydraulic fluid provided to the actuators. Valves 38a, 38b and 38c are used to selectively enable and disable the actuators 22a, 22b and 22c at different phases of the work cycle of the machine. During operation of the system, the hydraulic system pressure is controlled via the relief valve 34 to track the load pressure. The hydraulic system pressure typically exceeds the load pressure by a pressure margin that corresponds generally to a pressure drop across the flow control valve 36.

Figure 2:
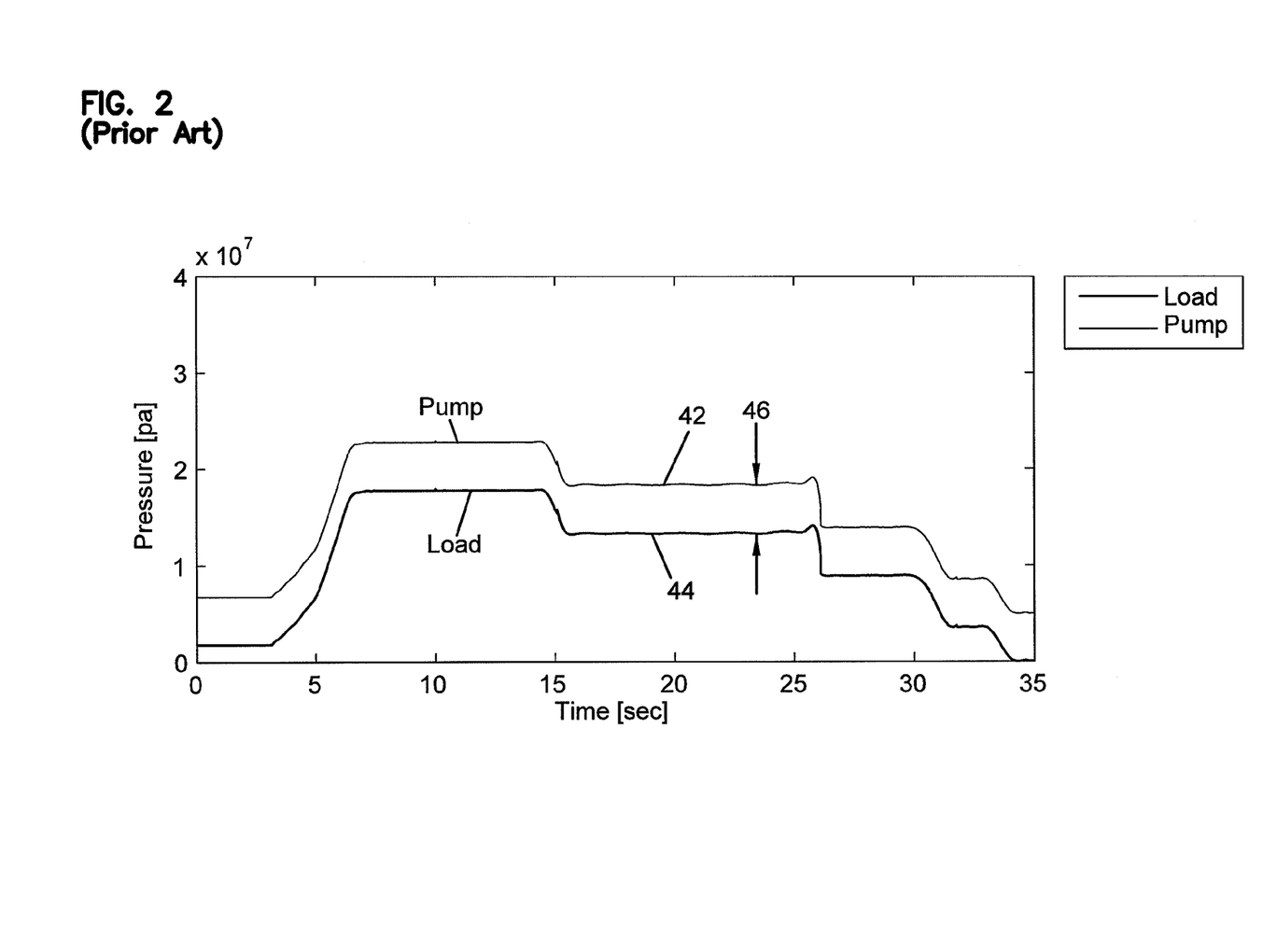
FIG. 2 is a graph showing hydraulic pressure profiles for one work cycle of the system of FIG. 1.

FIG. 2 depicts a system pressure profile 42 and a load pressure profile 44 for the hydraulic system 18. The system pressure profile 42 represents the hydraulic pressure at the pump outlet over the work cycle. The load pressure profile 44 represents the hydraulic pressure demand required by the load over the work cycle. As shown at FIG. 2, the system pressure profile 42 and the load pressure profile 44 track one another over the entire work cycle. The system pressure profile 42 and the load pressure profile 44 are separated by a margin 46 that corresponds to a pressure drop across the flow control valve 36. The system pressure is higher than the load pressure throughout the work cycle.

Figure 3:
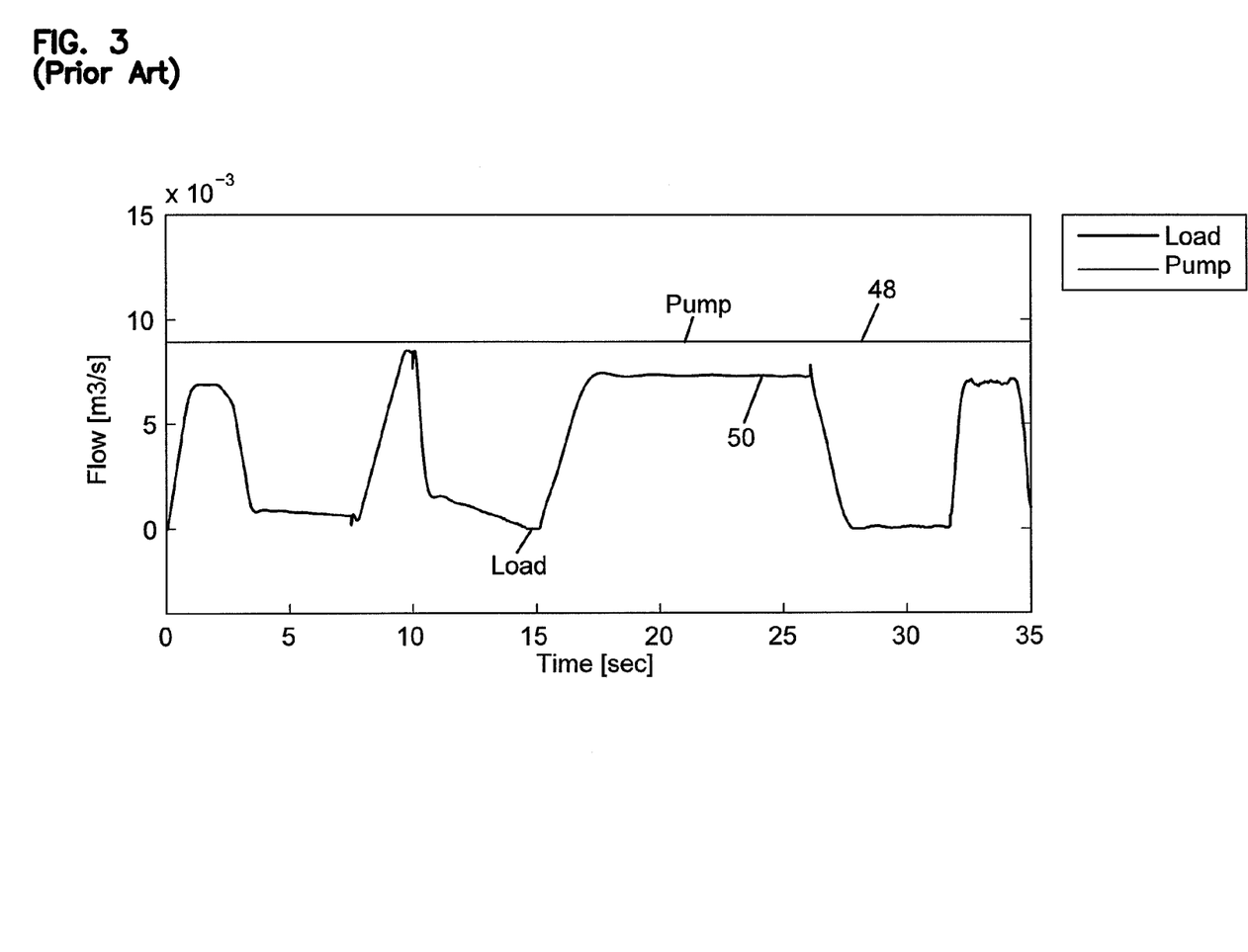
FIG. 3 is a graph showing flow rate profiles for one work cycle of the system of FIG. 1.

FIG. 3 depicts a system flow rate profile 48 and a flow demand profile 50 for the hydraulic system 18. The system flow rate profile 48 represents the hydraulic fluid output from the pump 24 over the work cycle. The flow demand profile 50 represents the flow required by the load over the work cycle. Since the pump is a fixed displacement pump driven by a constant speed motor, the system flow profile 48 is horizontal, thereby representing a constant flow output by the pump 24 over the duration of the work cycle. The electric motor 26 and the pump 24 need to be sized to meet peak power and peak flow demands. Therefore, a significant portion of the flow output from the pump 24 is passed to the reservoir 32 through the relief valve 34 without doing any useful work over the course of the full work cycle. If the peak power accounts for a small percentage of the overall work cycle, then a significant amount of energy is unused.

Figure 4:
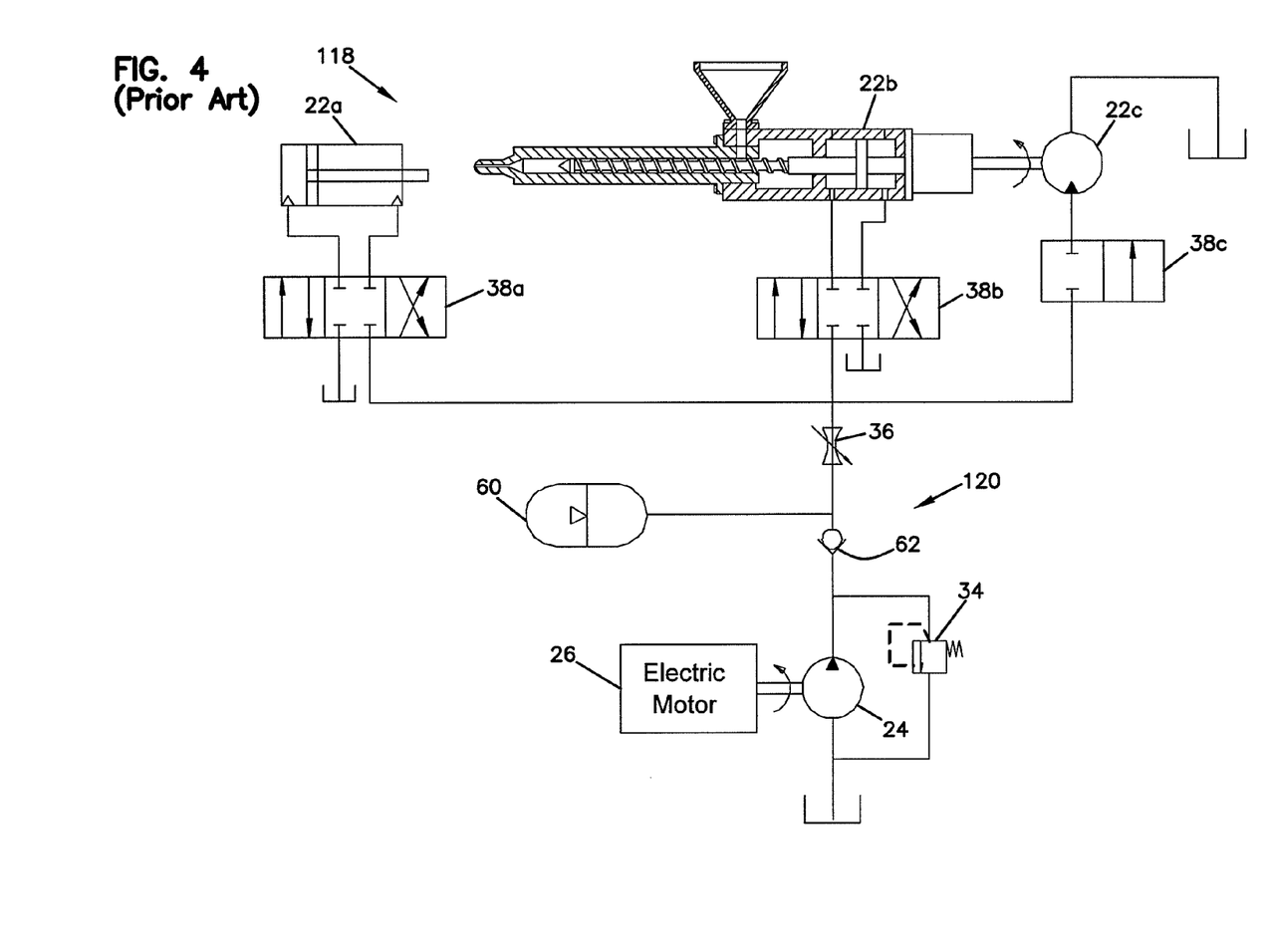
FIG. 4 is a schematic diagram showing another prior art hydraulic system including a hydraulic drive circuit that drives components of an industrial machine.

FIG. 4 illustrates hydraulic system 118 that uses another type of prior art hydraulic drive circuit 120 to drive an industrial machine having a repeating work cycle. The hydraulic drive circuit 120 has the same basic configuration as the hydraulic drive circuit 20 of FIG. 1, except for the addition of a hydraulic accumulator 60 and one-way check valve 62. The hydraulic accumulator 60 is connected between the pump 24 and the flow control valve 36. The one-way check valve 62 is installed between the accumulator 60 and the pump 24. The one-way check valve 62 prevents back-flow from the accumulator 60 toward the pump 24. Incorporating the accumulator 60 at the outlet side of the pump 24 filters pressure ripple and allows the pump 24 to be downsized. By including the accumulator 60, the pump 24 can be sized to provide the average flow required by the load over the work cycle.

Figure 5:
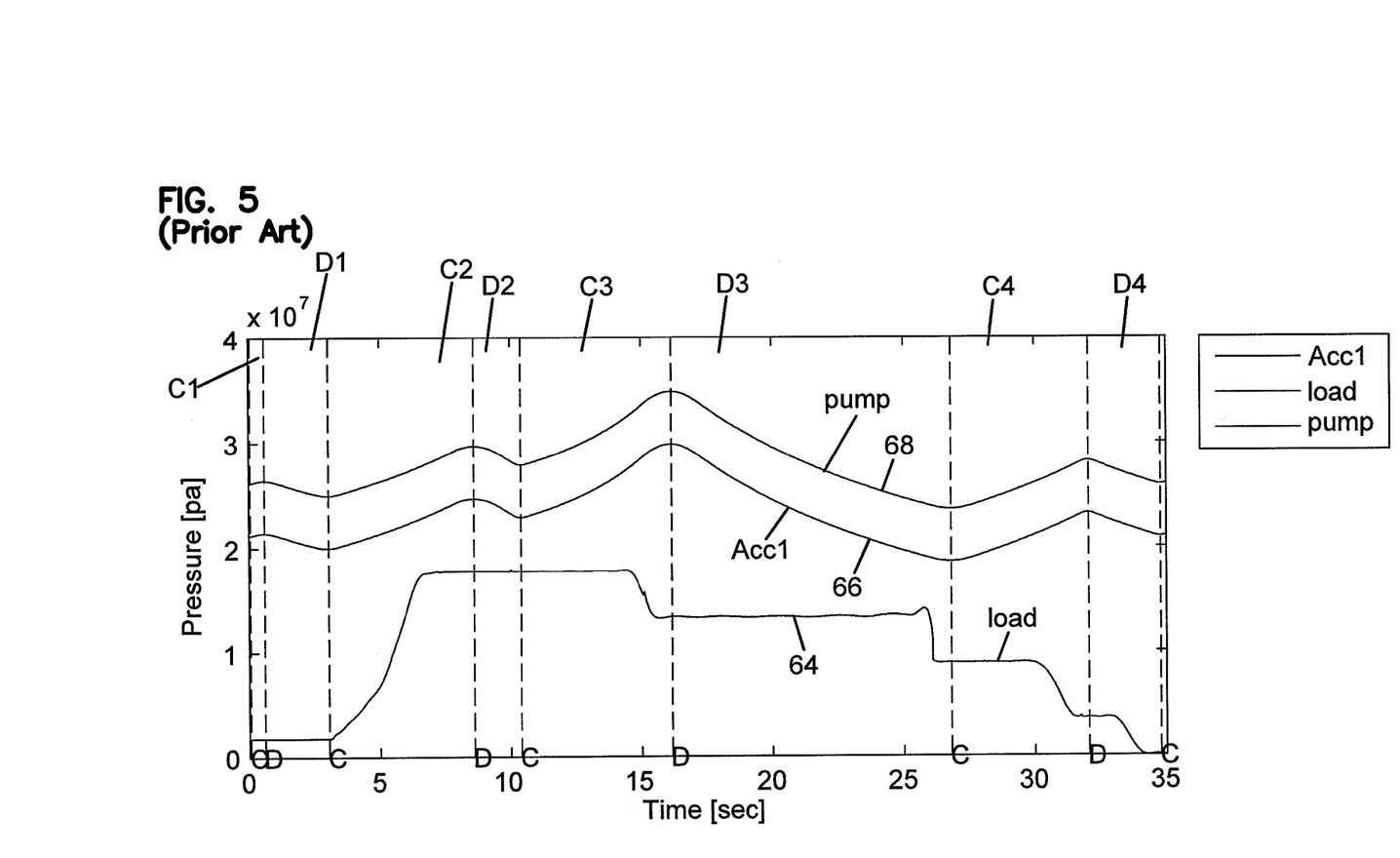
FIG. 5 is a graph showing hydraulic pressure profiles for one work cycle of the system of FIG. 4.

FIG. 5 depicts a load pressure profile 64, an accumulator pressure profile 66 and a system pressure profile 68 for the work cycle of the hydraulic system 118. As shown in FIG. 5, the pump pressure (i.e., the system pressure) is maintained above the accumulator pressure throughout the entire work cycle. Also, the accumulator and pump pressure track one another throughout the work cycle Referring to FIG. 6, a pump flow profile 70, an accumulator profile 72, a load flow profile 74 and a total flow profile 76 are depicted for the work cycle of the hydraulic system 118. The total flow profile 76 depicts the total flow provided by the combination of the pump 24 and the hydraulic accumulator 60. Since the pump 24 is a fixed displacement pump powered by a constant speed electric motor 26, the flow is constant thereby causing the pump flow profile 70 to be a horizontal line. The total flow profile 76 and the load profile 74 track one another. When the load flow demand is less than the pump flow, excess flow from the pump can be used to charge the accumulator 60. In contrast, when the load flow demand is greater than the pump flow, hydraulic fluid is discharged from the accumulator 60 so that the combined flow of the accumulator 60 and the pump 24 satisfies the load flow demand.

Figure 6:
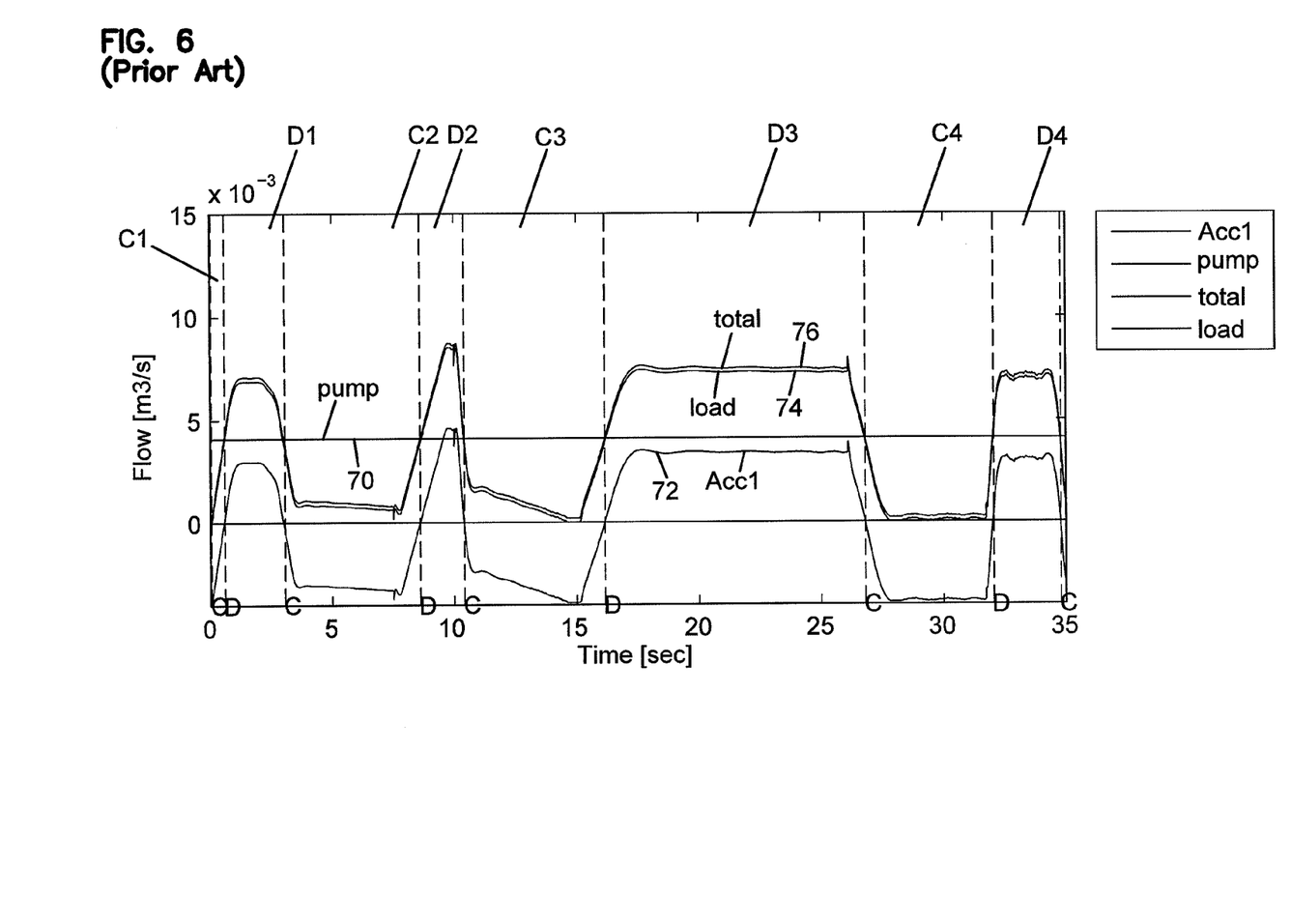
FIG. 6 is a graph showing hydraulic flow rate profiles for one work cycle of the system of FIG. 4.

As shown at FIG. 6, the work cycle can be divided into alternating charge and discharge phases. For example, the work cycle has four charge phases (C1, C2, C3 and C4) and four discharge phases (D1, D2, D3 and D4). The system pressure is maintained higher than the accumulator pressure throughout the work cycle. Also, since the accumulator is positioned on the upstream side of the proportional valve, the flow from the accumulator has to pass through the proportional valve to reach the load. Under conditions where the load pressure is substantially lower than the system and accumulator pressures, significant throttling loss can be generated across the flow control valve 36.

SUMMARY

One aspect of the present disclosure relates to hydraulic circuit architectures adapted to improve performance efficiency for drive circuits used to drive loads corresponding to repetitive industrial processes.

Another aspect of the present disclosure relates to hydraulic circuit architectures adapted for reducing throttling loss. In certain embodiments, aspects of the present disclosure can be employed in hydraulic circuits used to drive components of a machine or system having a repeating work cycle.

Still another aspect of the present disclosure relates to hydraulic circuit architecture for use in a drive circuit having a hydraulic pump for driving a load. The hydraulic circuit architecture includes a flow control valve for controlling a hydraulic fluid flow rate supplied from the hydraulic pump to the load. The hydraulic circuit architecture also includes a hydraulic fluid accumulator arranged in parallel with respect to the flow control valve.

A variety of additional aspects will be set forth in the description that follows. The aspects can relate to individual features and to combinations of features. It should be understood that both the foregoing general description and the following detailed description are exemplary and explanatory only and are not restricted of the broad concepts upon which the embodiments disclosed herein are based.

DETAILED DESCRIPTION

Figure 7:
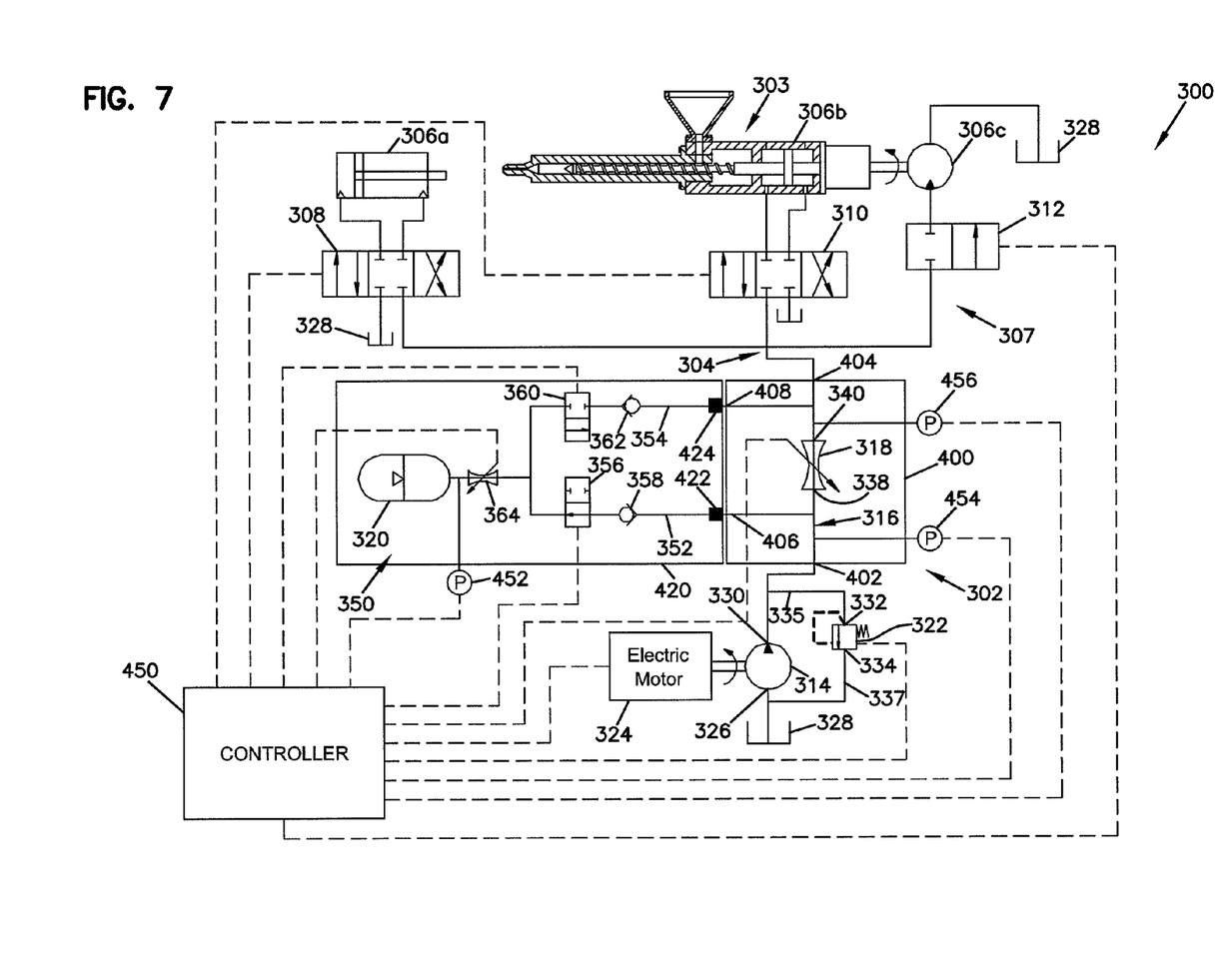
FIG. 7 is a schematic diagram of a hydraulic system in accordance with the principles of the present disclosure, the hydraulic system includes a hydraulic drive circuit for driving hydraulic components of a machine having a repeating work cycle.

FIG. 7 shows a hydraulic system 300 in accordance with the principles of the present disclosure. The hydraulic system 300 includes a hydraulic drive circuit 302 configured for driving a load 304 corresponding to hydraulically driven components of a machine 303 (e.g., an injection molding machine). In the depicted embodiment, the load 304 corresponds to a plurality of hydraulic actuators 306a, 306b and 306c that drive components of the hydraulically powered machine 303. In the depicted embodiment, the hydraulic actuator 306a is a hydraulic cylinder powering a clamp, the hydraulic actuator 306b is a hydraulic cylinder for axially moving an auger back and forth within a bore, and the hydraulic actuator 306c is a hydraulic motor for the turning the auger within the bore. While the machine 303 is depicted as an injection molding machine, it will be appreciated that aspects of the present disclosure are applicable to any type of hydraulic powered machine. In particular, aspects of the present disclosure are suited for hydraulic machines having repeating work cycles where the hydraulic pressure load and hydraulic flow load demanded by the machines over the work cycles vary according to predefined profiles.

The hydraulic system 300 also includes a valve arrangement 307 for distributing hydraulic fluid flow from the drive circuit 302 to the components of the machine 303 in a controlled manner. For example, the valve arrangement 307 enables and disables the components over the course of the work cycle so as to implement actions of a repetitive industrial process. In the depicted embodiment, the valve arrangement 307 includes two three-position directional control valves 308, 310 and a two position valve 312. Flow to the hydraulic actuators 306a and 306b is respectively controlled by the valves 308, 310. The valve 312 is used to open and close fluid communication with the actuator 306c. The valves 308, 310 and 312 function as a valve arrangement for electively enabling and disabling the actuators 306a, 306b and 306c over the course of the work cycle. Thus, the flow and pressure demands of the load vary over the course of the work cycle depending upon which of the hydraulic actuators 306a, 306b and 306c is enabled or disabled at a given time during the work cycle.

While various details have been provided about the machine 303 and the valve arrangement 307, it will be appreciated that such detail has been described merely to provide a representative environment to which aspects of the present disclosure can be applied. It will be appreciated that the various aspects of the present disclosure can be used to drive machines/loads having other types of hydraulic actuators, different configurations of actuators, and different types of valve configurations used to enable and disable such actuators.

The hydraulic drive circuit 302 has an architecture that enables power generation and power consumption to be effectively matched, thereby reducing throttling power losses. Referring to FIG. 7, the hydraulic drive circuit 302 of the hydraulic system 300 includes a circuit architecture having a hydraulic pump 314 that pumps hydraulic fluid through a work flow path 316 to the load 304. A flow control valve 318 is provided along the work flow path 316 for controlling a hydraulic fluid flow rate supplied from the hydraulic pump 314 to the load 304. The hydraulic circuit architecture also includes an accumulator 320 fluidly connected to the work flow path 316 and positioned in parallel with respect to the flow control valve 318. The parallel configuration of the accumulator 320 assists in enhancing the overall energy efficiency of the hydraulic drive circuit 302 over the course of a given work cycle of the load 304. In certain embodiments, a pressure relief valve 322 is provided for controlling an outlet pressure (e.g., a system pressure) of the pump 314.

In one embodiment, the pump 314 is a fixed displacement pump driven by a constant speed electric motor 324. In this embodiment, the pump 314 outputs hydraulic fluid at a constant rate throughout the work cycle. The pump 314 includes an inlet 326 in fluid communication with a reservoir 328 and an outlet 330 in fluid communication with the work flow path 316. Flow output from the pump 314 in excess of the flow requirement of the load 304 is either dumped to reservoir through the pressure relief valve 322 or used to charge the accumulator 320.

In other embodiments, however, the pump 314 may include a fixed displacement pump driven by a variable speed electric motor (e.g., a variable frequency drive). In still other embodiments, the pump 314 may include a variable displacement pump. For example, disclosure of one example drive circuit having variable pump arrangements and an accumulator may be found in copending U.S. application Ser. No. 13/273,573, filed herewith, and titled "Hybrid Hydraulic Systems for Industrial Processes," which claims the benefit of U.S. Provisional Application No. 61/393,556, filed Oct. 15, 2010, and titled "Hybrid System for High Efficiency Industrial Processes," the disclosures of both of which are hereby incorporated by reference herein.

In certain embodiments, the pressure relief valve 322 is a proportional relief valve that can be solenoid driven. The pressure relief valve 322 includes an inlet 332 and an outlet 334. The inlet 332 is in fluid communication with the work flow path 316 and the outlet 330 is in fluid communication with the reservoir 328. For example, flow line 335 fluidly connects the inlet 332 to the flow path 316 at a location between the outlet 330 of the pump 314 and the flow control valve 318. Also, a flow line 337 fluidly connects the outlet 330 of the pressure relief valve 322 to the reservoir 328. The pressure relief valve 322 prevents the pressure output from the pump from exceeding a threshold level set by the pressure relief valve. An electronic controller (e.g., electronic controller 450 described below) can be used to adjust the threshold level of the pressure relief valve 322 over the course of the work cycle of the machine 303.

In one embodiment, a flow control valve 318 can include a proportional valve including a spool driven by a solenoid. The flow control valve 318 can include an inlet 338 and an outlet 340. The flow control valve 318 is positioned downstream from the pressure relief valve 322 and the work flow path 316 passes through the flow control valve 318. An electronic controller (e.g., electronic controller 450 described below) can be used to control the flow control valve 318 such that the rate of flow passing through the valve 318 equals the load flow demand minus the accumulator discharge flow. In cases where the accumulator is not discharging, the valve is controlled such that he flow passing through the valve 318 equals the load flow demand.

In certain embodiments, the accumulator 320 is part of an accumulator subsystem 350 that is in fluid communication with the work flow path 316. The accumulator subsystem 350 includes a charge line 352 for charging the hydraulic fluid accumulator 320 and a discharge line 354 for discharging the hydraulic fluid accumulator 320. The charge line 352 connects to the work flow path 316 at a location upstream from the flow control valve 318 and the discharge line 354 connects to the work flow path 316 at a location downstream from the flow control valve 318.

The accumulator subsystem 350 also includes various valve components (e.g., a valve arrangement) for controlling hydraulic fluid flow through the subsystem. For example, the accumulator subsystem 350 includes a charge line valve 356 for selectively opening and closing the charge line 352. The accumulator subsystem 350 also includes a charge line one-way check valve 358 that allows hydraulic fluid to flow through the charge line 352 from the work flow path 318 to the accumulator 320 and prevents hydraulic fluid from flowing through the charge line 352 from the accumulator 320 to the work flow path 318. The accumulator subsystem 350 further includes a discharge line valve 360 and a discharge line one-way check valve of 362. The discharge line valve 360 is configured for selectively opening and closing the discharge line 354. The discharge line one-way check valve 362 is configured for allowing hydraulic fluid flow to flow through the discharge line 354 from the accumulator 320 to the work flow path 318 and to prevent hydraulic fluid from flowing through the discharge line 354 from the work flow path 318 to the accumulator 320. The accumulator subsystem 350 further includes an accumulator flow control valve 364 for controlling a charge rate of the accumulator 320 and for controlling a discharge rate of the accumulator 320.

In certain embodiments, the charge line valve 356 and the discharge line valve 360 are two position valves each including an open position and a closed position. The valves can include solenoid actuated spools. Additionally, in certain embodiments, the accumulator flow control valve 364 can be a proportional valve or variable orifice. Such a valve can include a spool the position of which is controlled by a solenoid. In other embodiments, the valves 356, 360 can be two-position proportional flow valves each having an open position having a variable orifice size for proportioning flow and a closed position. This type of configuration would eliminate the need for the accumulator flow control valve 364 since the valves 356, 360 would provide the flow proportioning function.

Referring to FIG. 7, the flow control valve 318 can be positioned within a valve housing 400 defining a portion of the work flow path 316. The valve housing 400 can include an inlet port 402 that fluidly connects to the outlet 330 of the pump 314 and an outlet port 404 that fluidly connects to the load 304. Additionally, the housing 400 can include an accumulator charge port 406 and an accumulator discharge port 408.

The accumulator subsystem 350 can mounted within an accumulator housing 420. The accumulator housing can define an accumulator charge port 422 that connects with the accumulator charge port 406 of the valve housing 400 and an accumulator discharge port 424 that connects with the accumulator discharge port 408 of the valve housing.

The hydraulic system 300 can also include an electronic controller 450 for coordinating the operation of the flow control valve 318, the accumulator subassembly 350, the pressure relief valve 322, the directional control valve 308, the directional control valve 310 and the two-position valve 312. Each of the above-identified valves can include a spool or other structure that is actuated by a solenoid. The electronic controller 450 can monitor the position of each spool and selectively energizer or de-energizes the solenoids to move the valves to the appropriate positions corresponding to a particular stage/phase in the work cycle of the machine. Various sensors may be provided throughout the hydraulic system 300. The sensors can interface with the electronic controller 450. Example sensors include an accumulator pressure sensor 452, a charge port pressure sensor 454, a discharge port pressure sensor 456, and various spool position sensors corresponding to each of the valves. The electronic controller 450 also monitors and controls the position of the accumulator flow control valve 364 as well as the positions of the charge line valve 356 and the discharge line valve 360. The electronic controller 450 is programmed to control operation of the hydraulic system 300 to achieve the required load flow and load pressure by using the minimal energy.

To design the hydraulic system, the flow and pressure demand profiles for the work cycle of the machine 303 are determined. Flow and pressure profiles for the accumulator and the pump are then designed to satisfy the flow and pressure demand profiles and the pump and accumulator are sized accordingly. The flow and pressure profiles are saved in memory and accessed by the electronic controller 450 such that the electronic controller 450 uses the flow and pressure profiles of the pump and the accumulator to operate the drive circuit so that the load is provided with flow and pressure the matches the flow and pressure demand profiles of the machine over the work cycle.

Figure 8:
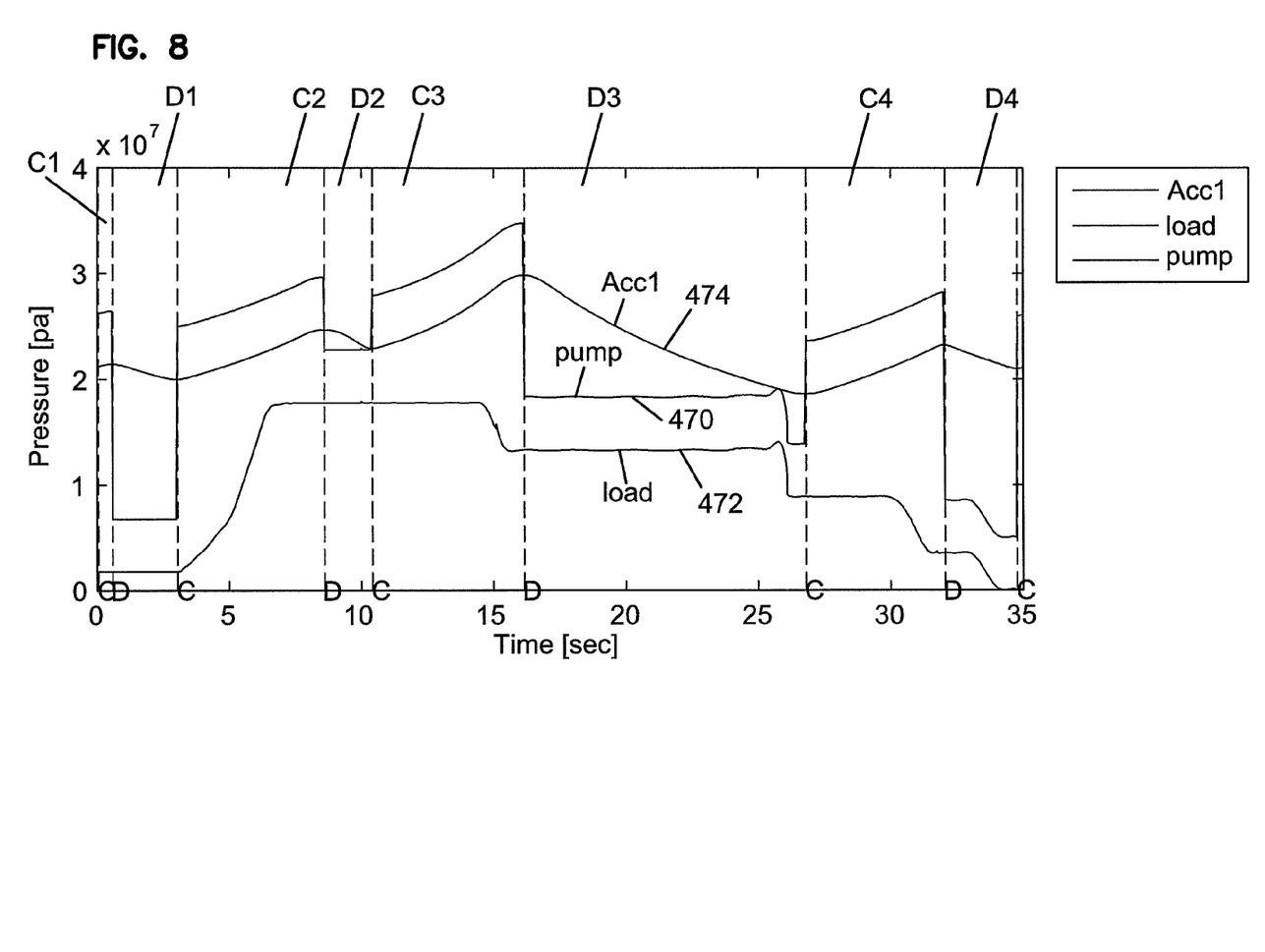
FIG. 8 is a graph showing hydraulic pressure profiles for one work cycle of the system of FIG. 7.

FIG. 8 is graph showing pressure profiles for one work cycle of the machine of FIG. 7. The pressure profile lines include a pump pressure line 470, a load pressure line 472, and an accumulator pressure line 474. The pump pressure and the accumulator pressures are both higher than the load pressure throughout the work cycle. The configuration of the accumulator subsystem 350 allows the system pressure to be set at a lower pressure than the accumulator pressure at predetermined phases during the work cycle. This allows the system pressure to more closely match the load pressure to enhance operating efficiency (e.g., by reducing throttling losses).

Figure 9:
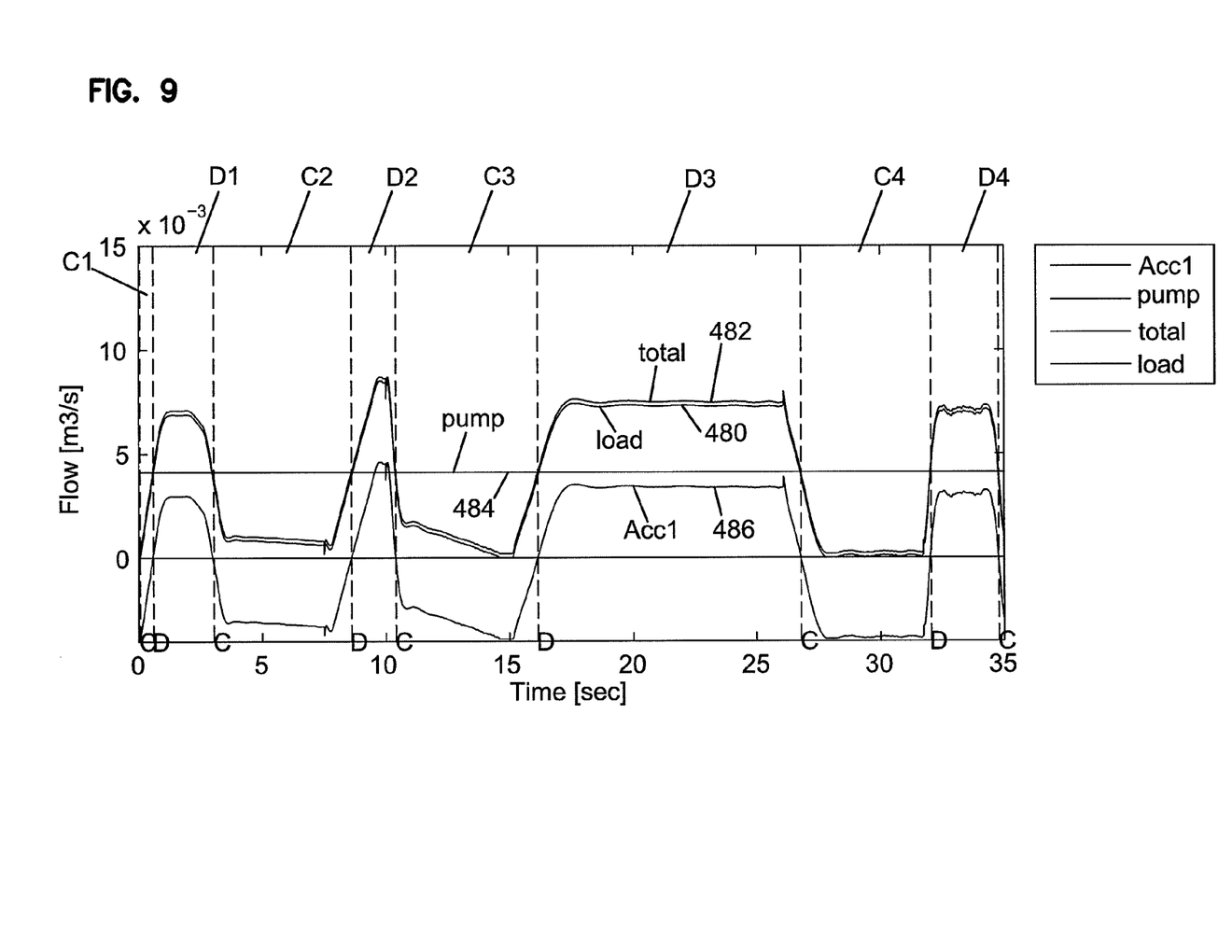
FIG. 9 is a graph showing flow rate profiles for one work cycle of the work cycle of the system of FIG. 7.

FIG. 9 is a graph showing flow rate profiles for the machine of FIG. 7. The flow rate profiles include a load demand flow 480, a total flow 482, a pump flow 484, and an accumulator flow 486. Total flow 482 is the total of the pump flow 484 and the accumulator flow 486. As shown in FIG. 9, the pump flow has a constant flow rate throughout the duration of the work cycle of the machine. Also, the total flow matches the load flow and the accumulator flow tracks/parallels the load flow.

When the flow demand of the load is less than the pump flow rate, the electronic controller 450 opens the charge line 352 and closes the discharge line 354 such that the accumulator 320 is charged. Thus, the system operates in a charge mode or phase. In the charge phase, the electronic controller 450 sets the system pressure to be either the accumulator pressure demand or the load pressure, whichever is higher, plus a margin. During charging, electronic controller controls the accumulator flow control valve 364 to achieve a desired charge flow to the accumulator.

When the flow demand of the load is greater than the flow rate of the pump, the electronic controller 450 closes the charge line 352 and opens the discharge line 354 such that the pump and the accumulator cooperate to satisfy the flow demand of the load. Thus, the system operates in a discharge mode or phase. In the discharge phase, the electronic controller 450 sets the system pressure to be the load pressure plus a margin if the accumulator alone can not satisfy the load flow demand. Alternatively, if the accumulator flow alone can satisfy the load flow demand, the system pressure is set to a minimal pressure. During accumulator discharge, electronic controller controls the accumulator flow control valve 364 to achieve a desired discharge flow from the accumulator.

As shown at FIGS. 8 and 9, the hydraulic system 300 has four charge phases (C1, C2, C3 and C4) and four discharge phases (D1, D2, D3 and D4) over the course of one work cycle. The electronic controller 450 controls the various valves of the system to achieve the pressure and flow profiles of FIGS. 8 and 9 for each cycle.

A hydraulic accumulator operates most efficiently when sized such that the accumulator pressure fairly closely matches the pressure of the load. This can present a difficulty when the accumulator is used to drive a load having a work cycle with a wide range of pressures. Specifically, in industrial processes where the load pressure varies dramatically, the mismatch between accumulator pressure and the load pressure can cause significant throttling loss. To address this situation, another aspect of the present disclosure relates to using an accumulator array (i.e., multiple accumulators) to improve the overall operating efficiency of a hydraulic drive circuit. Each accumulator of the array is configured or designed to operate at a different working pressure range. For example, one accumulator operates in a high pressure range, while another accumulator operates in a low pressure range. During the course of a given work cycle, the high pressure and low pressure accumulators will be selectively activated and deactivated to match the pressure of the load. For example, when the load is at a phase of the work cycle that requires low pressure flow, the low pressure accumulator can be activated and the high pressure accumulator can be deactivated. In contrast, when the load is at a phase of the work cycle that requires high pressure flow, the high pressure accumulator can be activated and the low pressure accumulator can be deactivated. During other parts of the work cycle, both accumulators may be deactivated. It will be appreciated that by using more than two accumulators in the array, the hydraulic drive circuit can be more finely tuned to match the load pressures corresponding to different times/phases in the work cycle.

Figure 10:
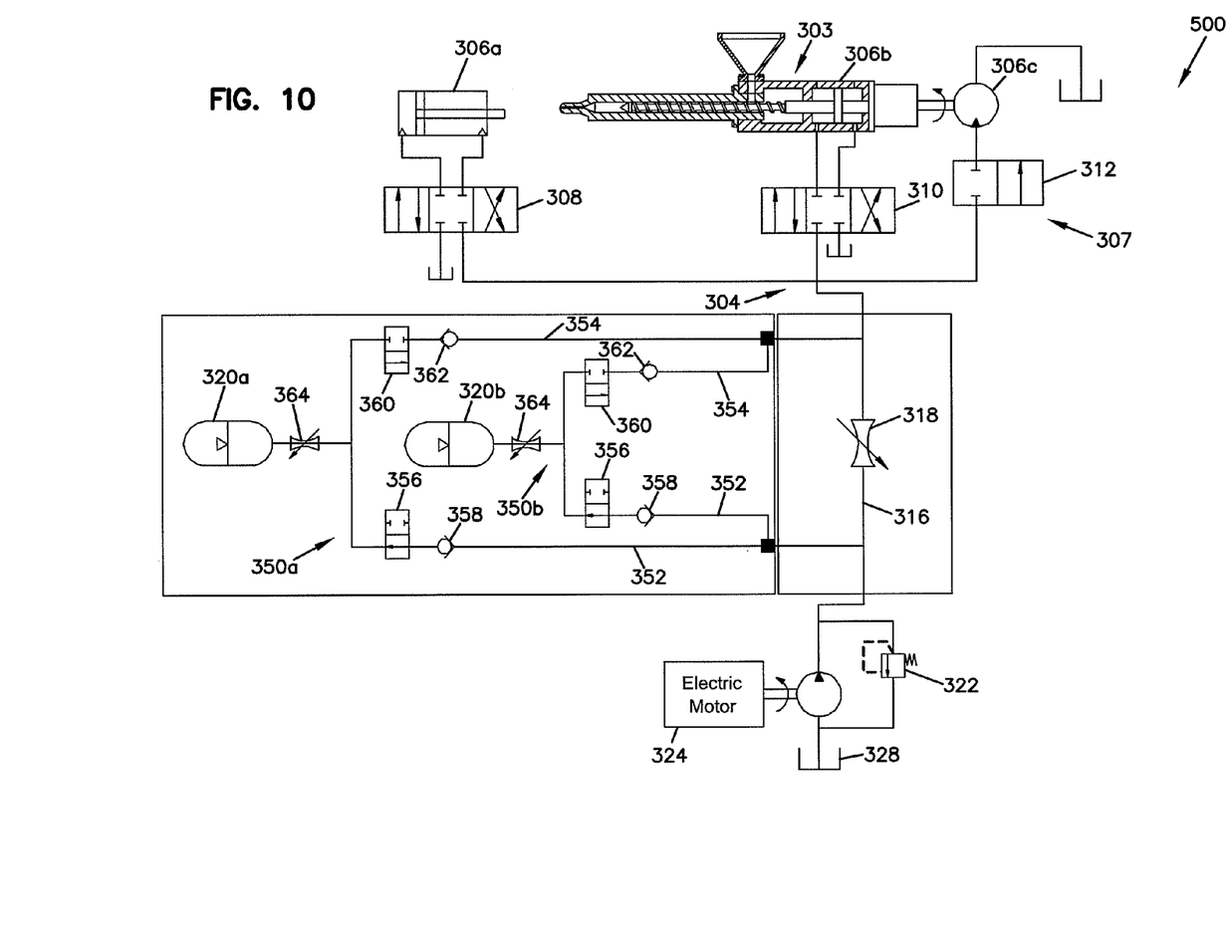
FIG. 10 is a schematic diagram of another hydraulic system in accordance with the principles of the present disclosure, the hydraulic system includes a hydraulic drive circuit for driving hydraulic components of a machine having a repeating work cycle.

FIG. 10 depicts another hydraulic system 500 in accordance with the principles of the present disclosure. The hydraulic system 500 modifies the parallel accumulator architecture of the hydraulic system 300 of FIG. 7 to include an accumulator array as compared to a single accumulator. The basic components of the hydraulic system 500 are the same as those described with respect to the hydraulic system of FIG. 7 and therefore have been assigned like reference numbers. The design has been modified to include first and second accumulator subsystems 350a, 350b that are both arranged in parallel with respect to the flow control valve 318. The accumulator subsystems 350a, 350b have the same configuration as the subsystem 350. However, the accumulator subsystem 350a has an accumulator 320a having a different accumulator pressure operating range than an accumulator 320b of the accumulator subsystem 350b. In one embodiment, the accumulator 320a has a higher accumulator pressure operating range than the accumulator operating range of the accumulator 320b. In one embodiment, the accumulator 320a is a high pressure accumulator and the accumulator 320b is a low pressure accumulator.

An electronic controller and various sensors are not shown in FIG. 10. However, it will be appreciated that such an electronic controller can be used as described above to control the various components in accordance with pre-defined pressure and flow profiles so as to match the flow and pressure demands of the load over the work cycle. The components can be controlled (e.g., selectively activated and de-activated) based on the predetermined timing and sequencing defined by the pre-defined flow and pressure profiles, or can be controlled on a real-time basis based on sensed pressure and flow rate data.

In operation of the system, the electronic controller controls charge and discharge of the accumulators 320a, 320b. Preferably, when one of the accumulators 320a, 320b is charging or discharging, the other of the accumulators is inactive. For example, during a phase of the work cycle where the demand flow is higher than the pump flow and the load pressure is relatively high, the high pressure accumulator 320a can be discharged to assist the pump in satisfying the flow demanded by the load. During discharge of the high pressure accumulator 320a, the low pressure accumulator 320b is inactive. During a phase of the work cycle where the demand flow is higher than the pump flow and the load pressure is relatively low, the low pressure accumulator 320b can be discharged to assist the pump in satisfying the flow demanded by the load. During discharge of the low pressure accumulator 320b, the low pressure accumulator 320b is inactive. The accumulators 320a, 320b can be charged during phases of the work cycle where the load flow demand is less than the pump/system flow.

Figure 11:
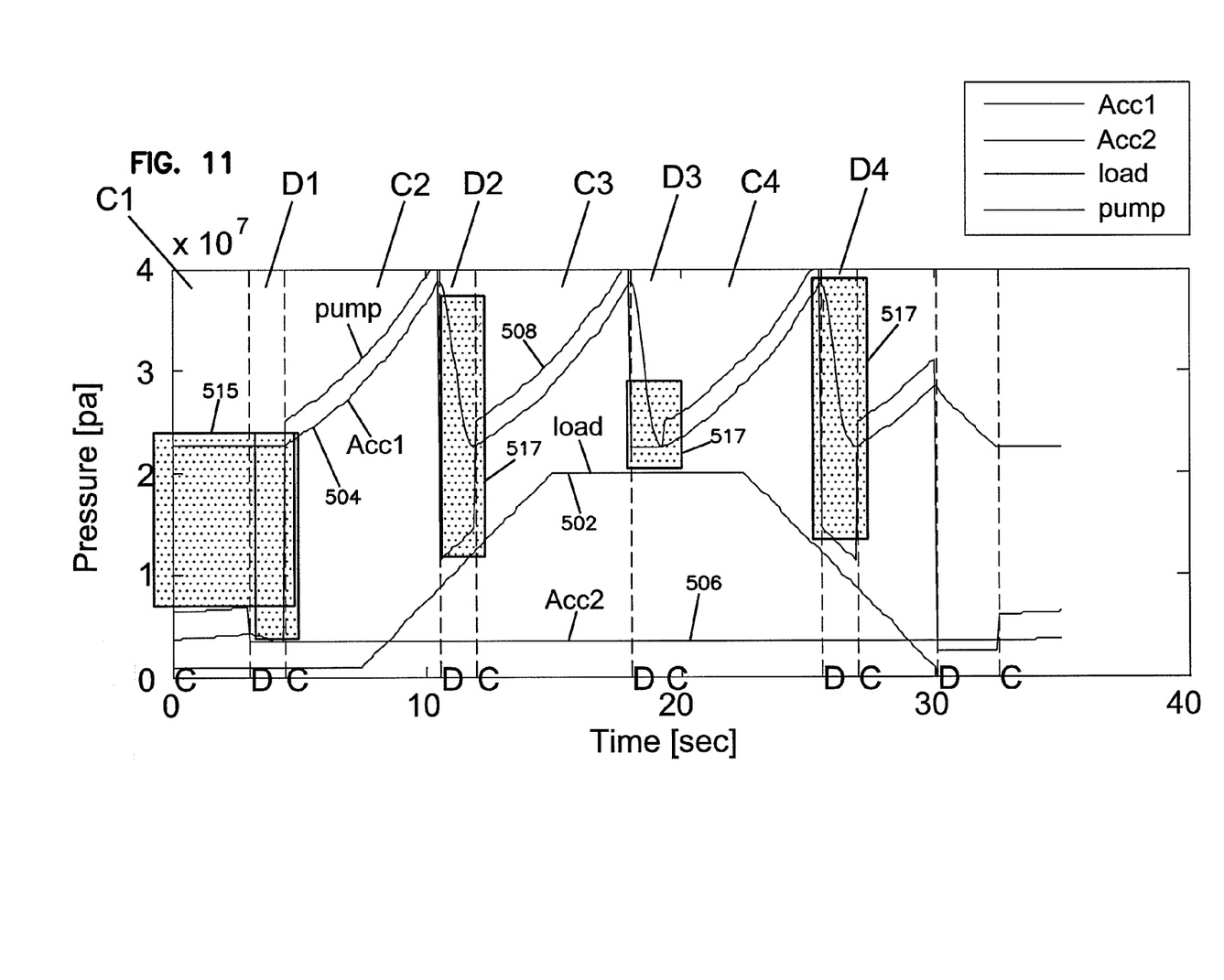
FIG. 11 is a graph showing hydraulic pressure profiles for one work cycle of the system of FIG. 10.

FIG. 11 is graph showing pressure profile lines for the hydraulic system 500 of FIG. 10 over an example work cycle. Accumulator and pump pressure profile lines corresponding to the drive system of the hydraulic system 500 are configured to match an example load pressure demand profile line 502. The accumulator and pump profile lines include an accumulator pressure profile line 504 corresponding to the accumulator 320a, and accumulator pressure profile line 506 corresponding to the accumulator 520b, and a pump pressure profile line 508 corresponding to the system pressure produced by the pump 314.

Figure 12:
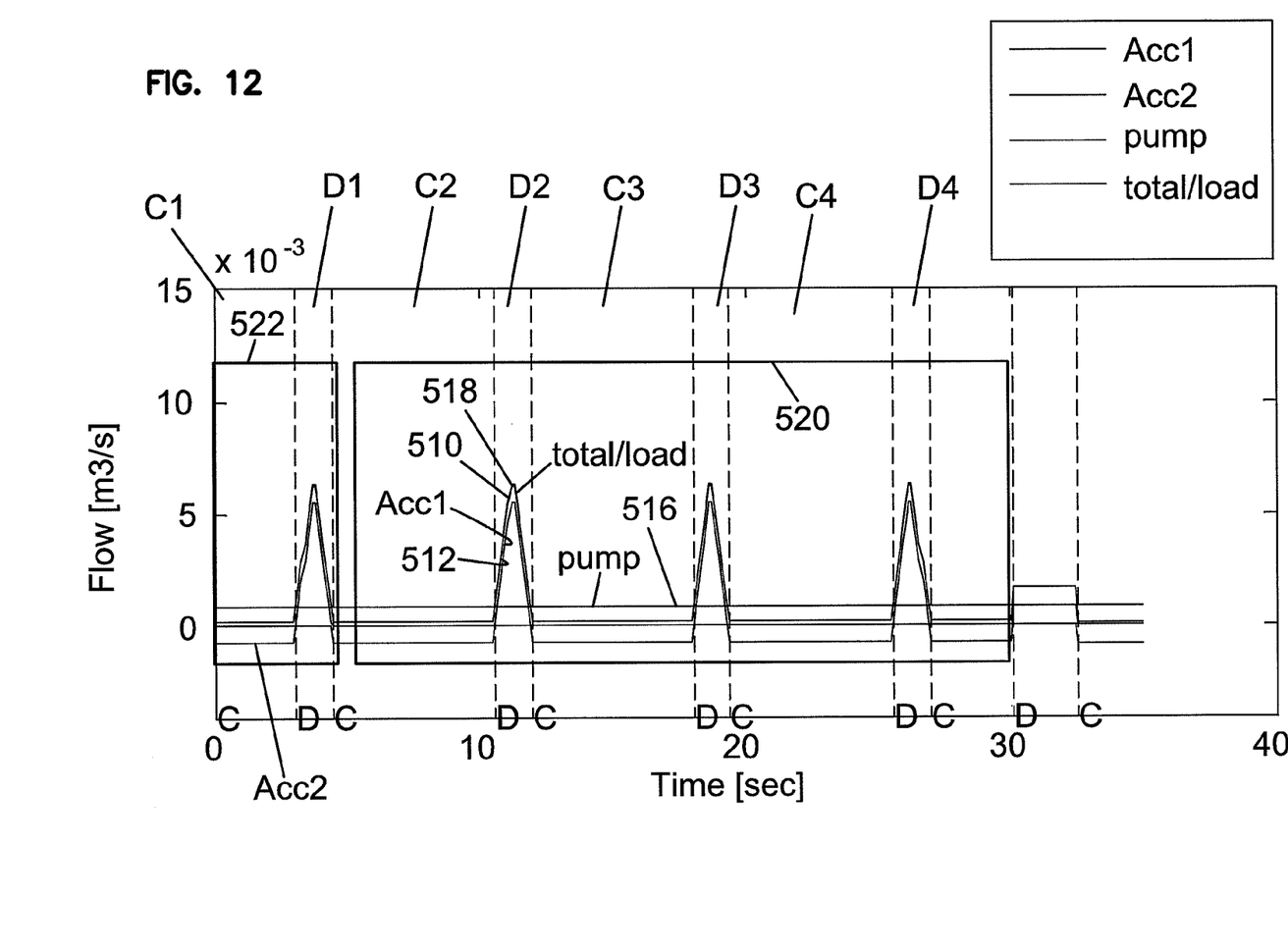
FIG. 12 is a graph showing flow rate profiles for one work cycle of the work cycle of the system of FIG. 10.

FIG. 12 is graph showing flow rate profile lines for the hydraulic system 500 of FIG. 10 over an example work cycle. Accumulator and pump flow profile lines corresponding to the drive system of the hydraulic system 500 are configured to match an example load flow demand profile line 510. The flow rate profile lines for the hydraulic drive of the hydraulic system 500 include an accumulator flow profile 512 corresponding to the accumulator 320a, an accumulator flow profile 514 corresponding to the accumulator 320b and a pump flow profile 516 corresponding to the pump 314. FIG. 12 also shows that the total flow, which represents the combined flow provided by the pump 314 and the accumulators 320a, 320b over the duration of the work cycle closely tracks the load flow profile and is shown as the same line as the load flow profile. In practice, the total flow can be slightly larger than the load flow.

Referring to FIGS. 11 and 12, over the course of the work cycle the hydraulic system 500 has at least charge phases C1-C4 and at least discharge phases D1-D4. The low pressure accumulator 320b is charged and discharged at phases C1 and D1. The high pressure accumulator 320a is charged and discharged at the remainder of the charge and discharge phases. At the charge phase C1 and discharge phase D1, the pressure demanded by the load is relatively low. By using the low pressure accumulator 320b in these phases, it is possible to significantly lower the operating pressure of the pump 314 to more closely match the pressure demand of the load (see region 515). This can provide energy savings relating to reduced throttling losses. Energy savings can also be provided at each of the discharge phases because the parallel arrangement of the accumulators allows the system pressure to be lower to be more closely match the load pressure demand (see regions 517). In FIG. 12, box 520 represents the portion of the work cycle where the high pressure accumulator 320a is active and the low pressure pump 320b is deactivated. Also, box 522 represents the portion of the work cycle where the low pressure accumulator 320b is active and the high pressure accumulator 320a is deactivated.

To design the hydraulic system 500 of FIG. 10, the force and speed requirements for the work cycle of the machine 303 are acquired. Next, force and speed requirements are converted into pressure and flow demand profiles for the work cycle (e.g., profile lines 502 and 510). Based on the flow profile and minimum pump flow, the charge and discharge phases for the accumulators of the accumulator array are established. Once the charge and discharge phases have been established, the pressure profile demand for the work cycle is evaluated and used to assign the appropriate accumulator to the appropriate charge and discharge phase based on how closely the operating pressure ranges of the accumulators match the load pressure demand during the phase. The actual charge and discharge flow of each accumulator is configured such that the state of charge for a given accumulator at the end of the cycle is identical to that in the beginning. Also, the flow of the system over the work cycle is assessed such that the summation of the pump flow and the accumulator flow is always greater than the load flow. In designing the system, it is preferably assumed that there is a gap in time from work cycle to work cycle. Such a gap in time can be leveraged to charge or discharge the accumulators as needed. If no gap in time exists between the two work cycles, the flow within each phase may be adjusted and the pump flow requirement may be increased accordingly.

Once the overall flow strategy and flow and pressure profiles have been established, the accumulator sizes and pressure ranges can be determined. Also, the necessary precharge values for the accumulators are calculated. Preferably, during discharge, the accumulator pressures should be higher than the load pressures. The pump and electric motor can be sized/configured based on the determined flow and pressure profiles.

When one of the accumulators is in charge mode, the system is set to the larger of the accumulator pressure or the load pressure plus a marginal pressure, the charge path to the accumulator is opened, and the flow control valve 318 is controlled to meet the flow demand. In the charge mode, the flow rate control valve 318 is controlled such that the flow passing through the valve 318 equals the flow demand of the load taking into consideration the rate of flow being directed into the accumulator through the charge path and the accumulator flow control valve 364. When one of the accumulators is in the discharge mode, the system pressure is set to load pressure plus a marginal pressure, the flow control valve 318 is fully opened and the accumulator flow control valve 364 is controlled such that the discharge flow rate combined with the flow rate to valve 318 equals the load flow rate demand.

It will be appreciated that the various graphs and data presented herein are the product of computer simulation not empirical data. Such information is provided to illustrate certain general concepts and operating modes of systems in accordance with the principles of the present disclosure and is not intended to be relied upon as precise empirical data.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An injection molding machine including an actuator drivable by a hydraulic pump, the injection molding machine comprising:
   a work flow path extending from the hydraulic pump to the actuator to provide pressurized fluid to the actuator;
   a proportional flow control valve disposed on the work flow path, the proportional flow control valve being configured to control a hydraulic fluid flow rate supplied from the hydraulic pump to the actuator;
   a hydraulic fluid accumulator disposed on the work flow path in parallel to the proportional flow control valve;
   an accumulator flow control arrangement disposed on the work flow path, the accumulator flow control arrangement being configured to control a hydraulic fluid charge flow rate provided to the hydraulic fluid accumulator from the hydraulic pump during a charge mode of the hydraulic fluid accumulator and to control a hydraulic fluid discharge flow rate provided from the hydraulic fluid accumulator to the actuator during a discharge mode of the hydraulic fluid accumulator; and a controller that interfaces with the proportional flow control valve and the accumulator flow control arrangement, wherein the controller is configured to control operation of the proportional flow control valve and the accumulator flow control arrangement such that the hydraulic pump and the hydraulic fluid accumulator both provide fluid flow to the actuator when the hydraulic fluid accumulator is in the discharge mode, wherein the controller is configured to control operation of the proportional flow control valve such that the hydraulic fluid flow rate through the proportional flow control valve equals a load flow demand minus the hydraulic fluid discharge flow rate when the hydraulic fluid accumulator is operating in the discharge mode, and wherein the controller is configured to control operation of the proportional flow control valve such that the hydraulic fluid flow rate through the proportional flow control valve equals the load flow demand when the hydraulic fluid accumulator is not in the discharge mode.

2. The injection molding machine of claim 1, further comprising a relief valve for controlling a hydraulic system pressure provided to the proportional flow control valve by the hydraulic pump, wherein the hydraulic system pressure is less than a discharge pressure of the hydraulic fluid accumulator when the hydraulic fluid accumulator is in the discharge mode.

3. The injection molding machine of claim 1, further comprising a relief valve positioned upstream from the hydraulic fluid accumulator and the proportional flow control valve configured to control a hydraulic system pressure output by the hydraulic pump.

4. The injection molding machine of claim 3, wherein the relief valve is a proportional relief valve.

5. The injection molding machine of claim 1, wherein the hydraulic pump is a fixed displacement pump.

6. The injection molding machine of claim 5, further comprising a constant speed electric motor configured to drive the fixed displacement pump.

7. The injection molding machine of claim 1, wherein the accumulator subsystem includes a charge line for charging the hydraulic fluid accumulator and a discharge line for discharging the hydraulic fluid accumulator, wherein the discharge line connects to the work flow path at a location downstream from the proportional flow control valve, and wherein the charge line connects to the work flow path at a location upstream from the proportional flow control valve.

8. The injection molding machine of claim 7, wherein the accumulator flow control arrangement includes:
a charge line valve configured to selectively open and close the charge line;
a charge line one-way check valve that allows hydraulic fluid to flow through the charge line from the work flow path to the hydraulic fluid accumulator and prevents hydraulic fluid from flowing through the charge line from the accumulator to the work flow path;
a discharge line valve configured to selectively open and close the discharge line; and
a discharge line one-way check valve that allows hydraulic fluid to flow through the discharge line from the hydraulic fluid accumulator to the workflow path and prevents hydraulic fluid from flowing through the discharge line from the work flow path to the hydraulic fluid accumulator.

9. The injection molding machine of claim 8, wherein the charge line valve and the discharge line valve each include a two position valve including an open position and a closed position.

10. The injection molding machine of claim 8, wherein the accumulator flow control arrangement includes an accumulator proportional flow control valve configured to control a charge rate of the hydraulic fluid accumulator and to control a discharge rate of the hydraulic fluid accumulator.

11. The injection molding machine of claim 6, further comprising:
a relief valve for controlling a hydraulic system pressure provided to the proportional flow control valve by the hydraulic pump;
a first valve arrangement for enabling and disabling the actuator;
a second valve arrangement of the accumulator flow control arrangement for controlling charging and discharging of the hydraulic fluid accumulator; and
wherein the controller is an electronic controller configured to coordinate operation of the proportional flow control valve, the relief valve, and the first and second valve arrangements such that the hydraulic fluid accumulator is charged when a flow demand of the actuator is less than an output flow of the hydraulic pump and the hydraulic accumulator fluid discharges when the flow demand of the actuator is greater than the output flow of the hydraulic pump.

12. The injection molding machine of claim 11, wherein during discharge of the hydraulic fluid accumulator the hydraulic system pressure is less than the accumulator pressure.

13. The injection molding machine of claim 11, wherein the actuator has a repeating work cycle, the work cycle including a pressure demand having a pressure profile that varies over a plurality of phases of the work cycle and a flow demand having a flow profile that varies over the plurality of phases of the work cycle.

14. The injection molding machine of claim 13, wherein the actuator includes a first hydraulic cylinder powering a clamp, and further comprising a second hydraulic cylinder for axially moving an auger and a hydraulic motor for rotating the auger.

15. The injection molding machine of claim 1, wherein the hydraulic fluid accumulator is a first hydraulic fluid accumulator, wherein a second hydraulic fluid accumulator is also arranged in parallel with respect to the flow control valve, and wherein the first and second hydraulic fluid accumulators have different accumulator operating pressure ranges.

\* \* \* \* \*